(12) United States Patent
Mammano et al.

(10) Patent No.: US 6,301,135 B1
(45) Date of Patent: Oct. 9, 2001

(54) ISOLATED SWITCHING-MODE POWER SUPPLY CONTROL CIRCUIT HAVING SECONDARY-SIDE CONTROLLER AND SUPERVISORY PRIMARY-SIDE CONTROLLER

(75) Inventors: Robert A. Mammano, Costa Mesa, CA (US); Harvey L. Golladay, Apex, NC (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/475,861

(22) Filed: Dec. 30, 1999

Related U.S. Application Data

(60) Provisional application No. 60/122,013, filed on Mar. 1, 1999.

(51) Int. Cl.$^7$ ................................................. H02M 3/335
(52) U.S. Cl. ................................................. 363/95; 363/132
(58) Field of Search ................................ 363/17, 49, 95, 363/97, 132

(56) References Cited

U.S. PATENT DOCUMENTS

| | | | |
|---|---|---|---|
| Re. 34,462 | 11/1993 | Whittle | 363/49 |
| 4,063,307 | 12/1977 | Stephens | 363/21 |
| 4,164,014 | 8/1979 | Crowe et al. | 363/49 |
| 4,215,392 | 7/1980 | Rhoads | 363/49 |
| 4,246,634 | 1/1981 | Purol | 363/49 |
| 4,455,526 | 6/1984 | Miller | 323/282 |
| 4,458,194 | 7/1984 | Geppert et al. | 318/811 |
| 4,461,980 | 7/1984 | Nilssen | 315/225 |
| 4,502,105 | 2/1985 | Jessee | 363/41 |
| 4,525,674 | 6/1985 | Kammiller | 328/63 |
| 4,574,342 | 3/1986 | Runyan | 363/134 |
| 4,617,622 | 10/1986 | Fox | 363/98 |
| 4,644,240 | 2/1987 | Horie et al. | 318/768 |
| 4,694,384 | * 9/1987 | Steigerwald et al. | 363/17 |
| 4,695,936 | 9/1987 | Whittle | 363/21 |
| 4,821,163 | 4/1989 | Bloom | 363/49 |
| 4,887,199 | 12/1989 | Whittle | 363/49 |
| 4,912,622 | 3/1990 | Steigerwald et al. | 363/98 |
| 4,967,332 | 10/1990 | Claydon et al. | 363/17 |
| 4,994,955 | 2/1991 | Schoofs et al. | 363/95 |
| 5,014,178 | 5/1991 | Balakrishnan | 363/49 |
| 5,206,800 | 4/1993 | Smith | 363/21 |
| 5,227,961 | 7/1993 | Claydon et al. | 363/17 |
| 5,265,001 | 11/1993 | Yasumura | 363/49 |
| 5,282,126 | 1/1994 | Hüsgen | 363/49 |
| 5,331,533 | 7/1994 | Smith | 363/20 |
| 5,488,551 | 1/1996 | Malik | 363/20 |
| 5,506,764 | 4/1996 | Hon et al. | 363/21 |
| 5,519,312 | 5/1996 | Wang et al. | 323/360 |
| 5,532,914 | 7/1996 | Kageyama et al. | 363/50 |
| 5,598,567 | 1/1997 | Ninomiya | 395/750 |
| 5,610,503 | 3/1997 | Fogg et al. | 323/283 |

(List continued on next page.)

*Primary Examiner*—Adolf Deneke Berhane
(74) *Attorney, Agent, or Firm*—Weingarten, Schurgin, Gagnebin & Hayes, LLP

(57) ABSTRACT

A primary-side power modulator for an isolated switching-mode power supply operating under secondary-side control comprising a pulse width determining circuit for real-time primary-side adjustment of a PWM control signal received from a secondary-side PWM controller. While accepting pulse width commands from an isolated secondary-side PWM controller, the pulse width determining circuit has the ability to reduce the width of the switching pulse in response to primary-side information. The power modulator may further comprise a start-up circuit for ensuring that the primary-side supply voltage is above a minimum under-voltage lock out threshold, a soft start circuit for controlling the power switch at power-up, a pulse receiver for receiving the PWM control signal generated by the secondary-side PWM controller, and a drive circuit for driving an external solid-state power switch with the adjusted PWM control signal.

21 Claims, 3 Drawing Sheets

U.S. PATENT DOCUMENTS

| | | | |
|---|---|---|---|
| 5,663,627 | * 9/1997 | Ogawa | 318/803 |
| 5,675,485 | 10/1997 | Seong | 363/97 |
| 5,680,302 | * 10/1997 | Iwata et al. | 363/132 |
| 5,812,385 | 9/1998 | Leu | 363/49 |
| 5,815,383 | 9/1998 | Lei | 363/49 |
| 6,038,142 | * 3/2000 | Fraidlin et al. | 363/17 |

* cited by examiner

ISOLATED SWITCHING-MODE POWER SUPPLY CONTROL CIRCUIT HAVING SECONDARY-SIDE CONTROLLER AND SUPERVISORY PRIMARY-SIDE CONTROLLER

CROSS REFERENCE TO RELATED APPLICATIONS

This application claims priority under 35 U.S.C. §119(e) to U.S. Provisional Application No. 60/122,013, filed on Mar. 1, 1999; the disclosure of which is hereby incorporated by reference.

STATEMENT REGARDING FEDERALLY SPONSORED RESEARCH OR DEVELOPMENT

N/A

BACKGROUND OF THE INVENTION

The present invention relates to switching-mode power supplies and, more particularly, to primary-side start circuits for switching-mode power supplies.

Switching-mode power supplies for the efficient regulation of a direct-current (DC) voltage are well known. A switching-mode power supply "chops" a DC input voltage to produce a high-frequency alternating current (AC) rectangular waveform by operating a power transistor in a non-linear "switching" mode. A pulse width modulator (PWM) controller generates a pulse train that is used to switch the power transistor on and off. The resulting high-frequency AC rectangular waveform is rectified and L-C filtered to produce an output DC voltage. The DC output voltage, which varies with the width of the switching pulse, is compared against a reference voltage to produce a DC error signal. The PWM controller uses the error signal to adjust or modulate the switching pulse width and thereby regulate the DC output voltage.

Many applications require isolation between the power source and the load, and a switching mode power supply typically includes a power transformer that, inter alia, provides isolation. The PWM controller may be placed either on the primary (i.e., source) side or secondary (i.e., load) side of the transformer. When the PWM controller is placed on the primary side it can be easily powered by the primary power source, but feedback of the low-level analog error signal across the isolation boundary is difficult. A secondary-side PWM controller offers several advantages over a primary-side PWM controller, including easier closure of the analog feedback loop, easier feedback of the high-level digital PWM signal across the isolation boundary, simpler load management (e.g., power monitoring of the load, sequencing from the load, frequency synchronization with the load), easier load current sensing, a load sharing capability, faster loop response and the direct drive of synchronous rectifiers. However, the secondary-side PWM controller, which is isolated from the primary power source, operates from secondary-side power and thus cannot generate a PWM signal to initiate operation of the power transistor switch.

One solution to the secondary-side PWM controller problem is to provide a primary-side startup circuit, typically comprising a free running oscillator, to generate a switching pulse train and thereby initiate operation of the power transistor. For example, U.S. Pat. No 4,694,384 (Steigerwald et al.) discloses a switching-mode power supply having a primary-side voltage controlled oscillator (VCO) for generating a startup switching pulse train and a primary-side digital data detector for receiving digital error data from a secondary side PWM generator via an electrically-isolated data transmission device, such as a pulse transformer. A multiplexing circuit selects the VCO output during startup and switches to the PWM generator output during normal "run"operation. U.S. Pat. No 4,887,199 (Whittle) discloses a switching-mode power supply having a primary-side relaxation oscillator for generating a startup switching pulse train and a circuit for disabling the startup switching pulse train when a secondary-side pulse generator begins normal operation. In both patents, the passing of PWM control to the secondary-side for normal operation is absolute with only secondary-side information being factored into the PWM control signal. The inability to make primary-side adjustments to the PWM control signal renders the isolated switching-mode power supply a less than optimal solution for a typical universal-input power supply.

BRIEF SUMMARY OF THE INVENTION

A primary-side power modulator for an isolated switching-mode power supply operating under secondary-side control comprises a pulse width determining circuit for real-time primary-side adjustment of a PWM control signal received from a secondary-side PWM controller. While accepting pulse width commands from an isolated secondary-side PWM controller, the pulse width determining circuit has the ability to reduce the width of the switching pulse in response to primary-side control information, such as maximum duty-cycle limit and maximum power switch current. Thus, the primary-side modulator functions in a supervisory manner to override the control exerted by the secondary-side controller under certain potentially damaging operating conditions. The power modulator may further comprise a start-up circuit for ensuring that the primary-side supply voltage is above a minimum under-voltage lock out threshold, a soft start circuit for controlling the power switch at power-up, a pulse receiver for receiving the PWM control signal generated by the secondary-side PWM controller, and a drive circuit for driving an external solid-state power switch with the adjusted PWM control signal.

BRIEF DESCRIPTION OF THE SEVERAL VIEWS OF THE DRAWING

The invention will be more fully understood by reference to the following Detailed Description of the Invention in conjunction with the drawings, of which.

DETAILED DESCRIPTION OF THE INVENTION

Figure 1:
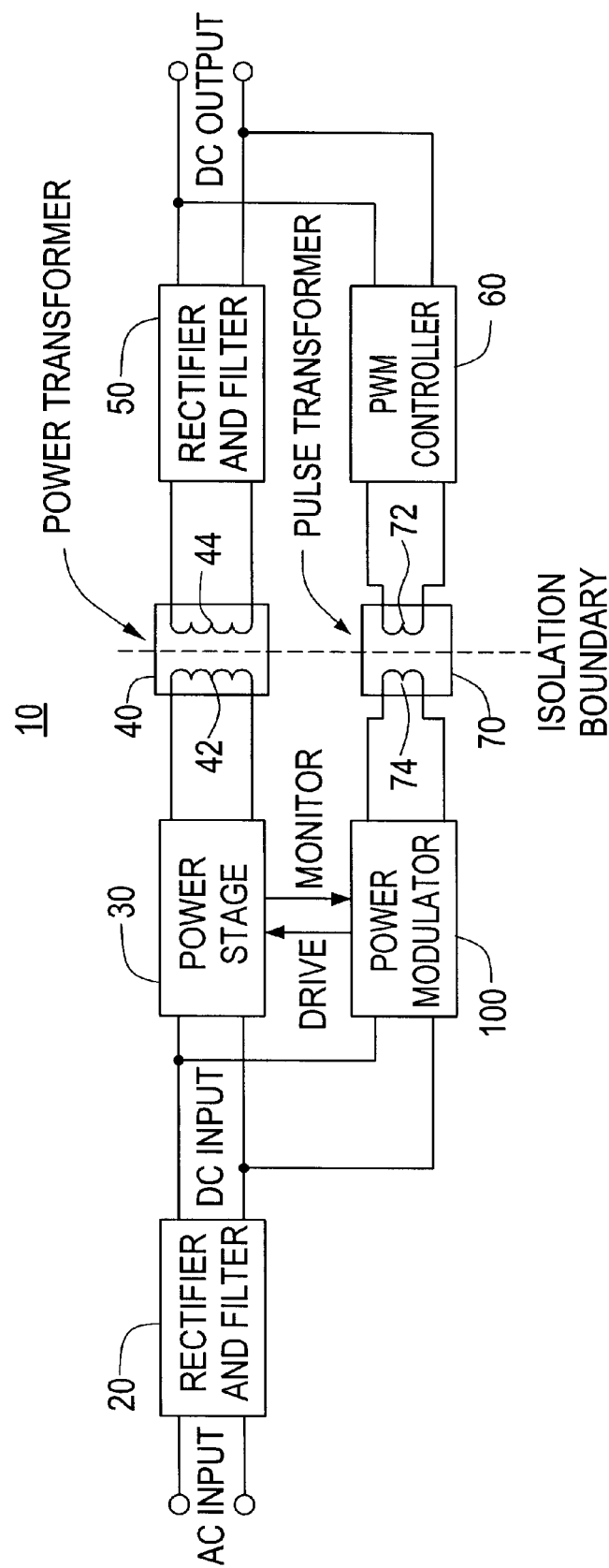
FIG. 1 is a block diagram of an isolated switching-mode power supply incorporating a primary-side power modulator in accordance with the invention.

A block diagram of an isolated switching-mode power supply 10 incorporating a primary-side power modulator 100 in accordance with the invention is illustrated in FIG. 1. The power supply 10 converts an alternating current (AC) voltage, AC INPUT, to a direct current (DC) voltage, DC OUTPUT. The power supply 10 further comprises an input rectifier and filter circuit 20, a power stage 30, a power transformer 40, an output rectifier and filter circuit 50, a secondary-side pulse width modulator (PWM) controller 60, and a pulse transformer 70.

The input rectifier and filter stage 20 converts the AC INPUT to a DC INPUT voltage. The power modulator 100 drives the power stage 30 in an open-loop mode at power up to initiate a high-frequency switched current flow through a primary winding 42 of the power transformer 40. The output rectifier and filter 50 converts the high-frequency switched-waveform voltage developed across a secondary winding 44 of the power transformer 40 to the DC OUTPUT voltage. The secondary-side PWM controller 60 compares the DC OUTPUT voltage to a DC reference voltage to produce an error voltage. The PWM controller 60 then converts the error voltage to a PWM control signal which is applied to a primary winding 72 of the pulse transformer 70. When the power modulator 100 detects the PWM control signal at a secondary winding 74 of the pulse transformer 70, the power modulator 100 transitions from the open-loop mode to a closed-loop mode under secondary-side control, but having the capability to adjust the PWM control signal in response to primary-side conditions, such as maximum duty-cycle limit and primary-side current limit.

Figure 2:
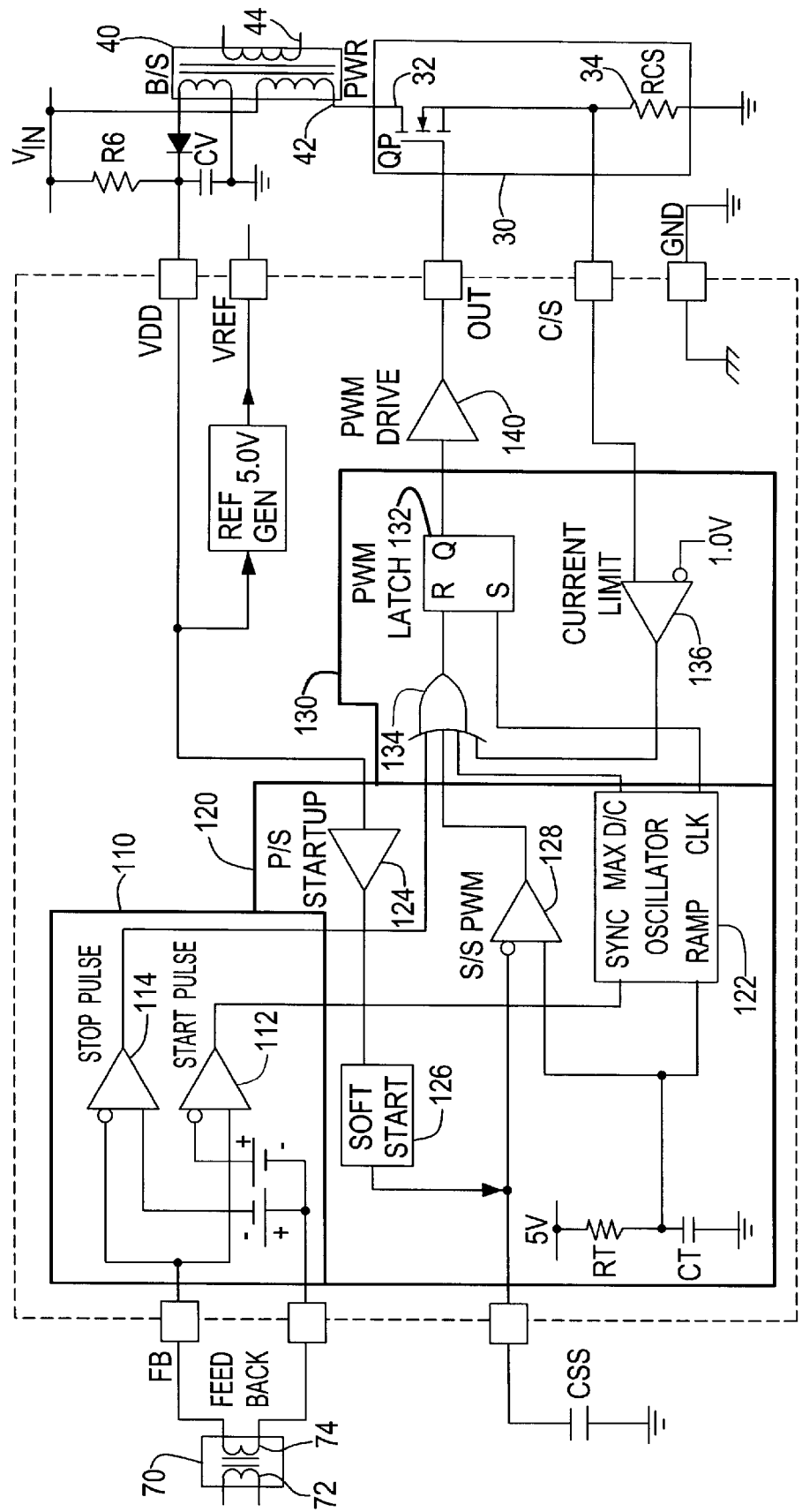
FIG. 2 is a block diagram of a primary-side power modulator in accordance with the invention.

A block diagram of the primary-side power controller 100 is illustrated in FIG. 2. The secondary winding 74 of the pulse transformer 70 is connected to a pulse receiver circuit 110 comprising a start pulse comparator 112 and a stop pulse comparator 114. Because the power modulator 100 detects the rising and falling edges of a switching pulse, the signal passed through the pulse transformer need not replicate the pulse shape of the PWM control signal but instead need only contain those frequency components necessary to detect the rising and falling pulse edges. A rising edge of the PWM signal produces a positive spike across the secondary winding 74 that is detected by the start pulse comparator 112. A falling edge of the PWM control signal produces a negative spike across the secondary winding 74 that is detected by the stop pulse comparator 114.

A startup circuit 120 includes an oscillator 122 that runs open loop when AC power is first applied to the power supply 10 and the primary-side supply voltage has risen above a minimum under-voltage lock out threshold, or at other times when the PWM control signal may be absent. The open-loop switching frequency is determined by the time constant of a timing resistor, $R_T$, and a timing capacitor, $C_T$. The loop is closed when the power modulator 100 receives the PWM control signal from the secondary-side PWM controller 60 so that the oscillator 122 is synchronized to the PWM control signal by the start pulse.

A pulse width determining circuit 130 includes a PWM latch 132 that determines the width of each switching pulse applied to an external solid-state power switch, i.e., MOSFET device 32 of the power stage 30. The switching pulse width is defined by the time duration between a set and the subsequent reset of the PWM latch 132. The PWM latch 132 is set by the oscillator clock to thereby synchronize the rising edge of the latch output with the rising edge of the switching pulse. During normal operation, the PWM latch 132 is reset by the stop pulse to initiate the falling edge of the switching pulse and thereby determine the switching pulse width. The output of the PWM latch 132 is passed through a PWM drive amplifier 140, and the amplifier output is applied to the gate of the MOSFET device 32.

In addition to the stop pulse, a soft-start signal, a maximum duty-cycle limit signal and a current-limit signal also serve as inputs to a multiple-input OR gate 134. Each OR gate input may independently reset the PWM latch 132 and thereby prematurely terminate the switching pulse. The soft-start signal causes the switching pulse width to gradually increase from zero at power supply startup. Specifically, a power supply startup comparator 124 detects when the DC INPUT voltage has reached an acceptable level and enables a soft-start circuit 126 for charging an external soft-start capacitor, $C_{SS}$. A soft-start comparator 128 then compares the soft-start capacitor voltage with the oscillator ramp voltage to generate the soft-start signal.

The maximum duty-cycle limit signal and current limit-signal are part of the supervisory functionality of the primary-side modulator 100. The maximum duty-cycle limit signal is produced by the oscillator 122 and prevents the switching pulse width from exceeding a maximum value ensuring that there is an adequate amount of time to reset the power transformer 40. In particular, it overrides excessively wide pulses of the PWM control signal and also serves as the stop pulse when the PWM control signal is absent. The current-limit signal is generated by a current-limit comparator 136 that detects when the voltage across an external primary-winding current sensing resistor, $R_{CS}$, has exceeded a predetermined level.

Figure 3:
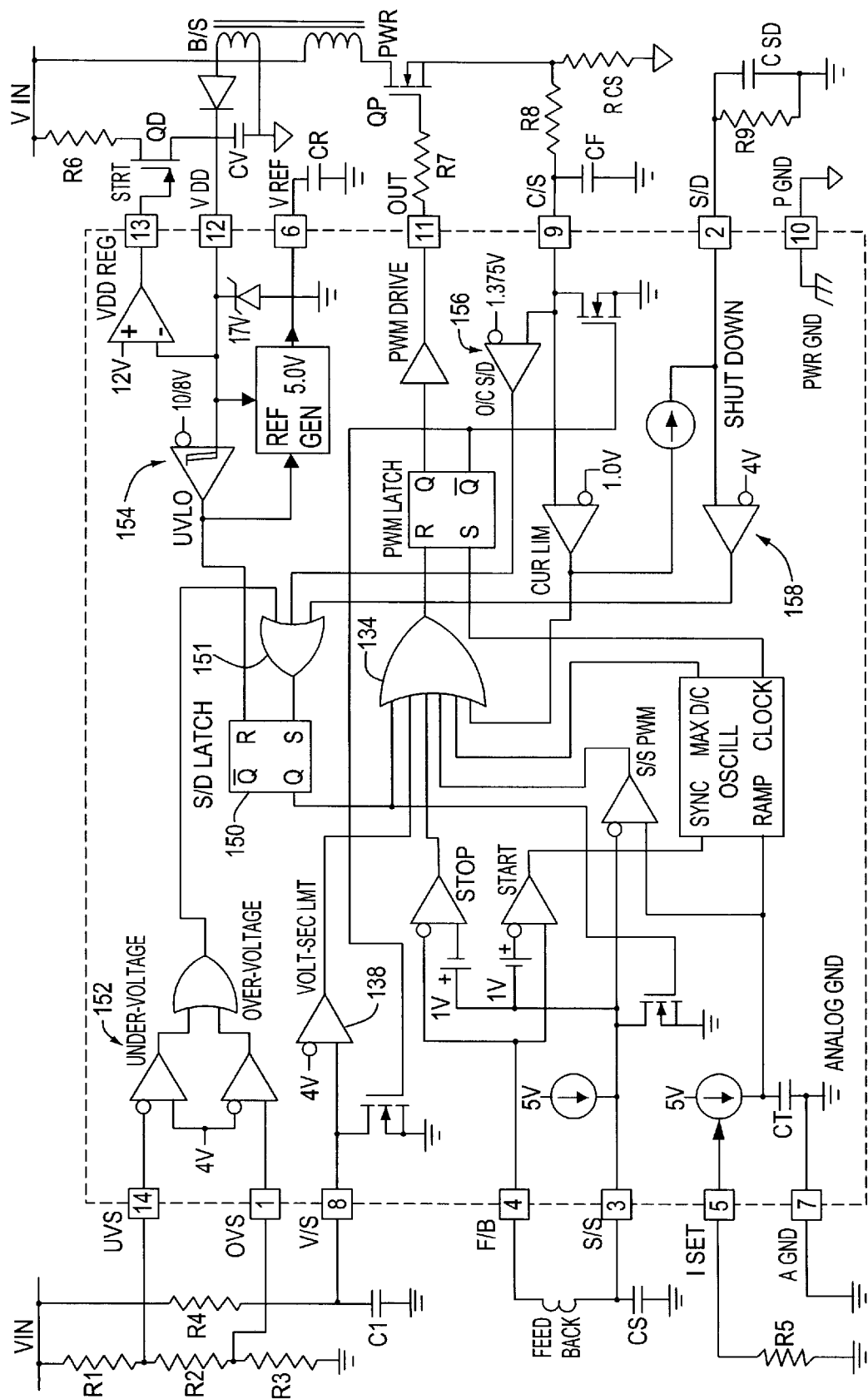
FIG. 3 is a block diagram of an alternative embodiment of the primary-side power modulator of FIG. 2.

As shown in FIG. 3, additional primary-side protection circuitry, such as an input volt-second clamp 138, may be implemented by providing the appropriate detection and signal generation circuitry and one or more additional inputs to the reset OR gate 134. Furthermore, a complete power supply shutdown (and follow-up restart) for major faults, such as input under-voltage or over-voltage 152, power modulator supply under-voltage lock out 154, excessive over-current 156 and continuous pulse-by-pulse over-current 158, may be implemented by providing the appropriate detection and signal generation circuitry, a shutdown latch 150 having a multiple-input OR gate 151 with inputs for each major fault, and an additional input to the reset OR gate 134 for the output of the shutdown latch 150.

It should further be appreciated that alternative mechanisms for transmitting the PWM control signal in isolation from the secondary-side PWM controller 60 to the primary-side power modulator 100 may be employed. For example, an electro-optic coupler may be used in place of the pulse transformer 70.

Having described a preferred embodiment of the invention, it will be apparent to one of skill in the art that other embodiments incorporating its concepts may be used. Accordingly, the invention should be limited only by the spirit and scope of the appended claims.

What is claimed is:

1. Control circuitry for an isolated switching-mode power supply operating under secondary-side control, comprising:
   a secondary-side controller operative to monitor an output voltage of the power supply and to generate a pulse-width-modulated (PWM) control signal, the PWM control signal being generated such that it can be used to control one or more primary-side switching elements in the power supply to maintain a predetermined output voltage level; and
   a primary-side controller operative to receive the PWM control signal and to generate a PWM drive signal to control the primary-side switching elements, the primary-side controller including:
   supervisory circuitry operative to detect certain primary-side operating conditions under which the modulation of the PWM drive signal is to be modified from that dictated by the PWM control signal; and pulse width determining circuitry operative to modulate the PWM drive signal as dictated by the PWM control signal and upon detection of the certain operating conditions to modify the modulation of said PWM drive signal accordingly.

2. Control circuitry according to claim 1, further comprising an isolation device for coupling the PWM control signal from the secondary-side controller to the primary-side controller, and wherein the primary-side controller further includes a pulse receiver circuit for receiving said PWM control signal from said secondary-side controller via said isolation device, said pulse receiver circuit being operative to generate power stage activating pulses upon detection of leading edges of said PWM control signal and power stage de-activating pulses upon detection of trailing edges of said PWM control signal.

3. Control circuitry according to claim 2, wherein said power stage activating pulses are used to synchronize leading edges of pulses of said PWM drive signal with leading edges of said PWM control signal, and further wherein said power stage de-activating pulses are used to generate trailing edges of pulses of said PWM drive signal.

4. Control circuitry according to claim 2, wherein said isolation device is a pulse transformer.

5. Control circuitry according to claim 1, wherein said primary-side controller includes an oscillator for generating a clock signal and a soft start circuit for generating a soft start signal, said oscillator operating in an open loop mode at power supply start up and when said PWM control signal is not received, said oscillator being synchronized to leading edges of pulses of said PWM control signal when said pulse determining circuitry modulates said PWM drive signal as dictated by said PWM control signal.

6. Control circuitry according to claim 5, wherein said pulse width determining circuit synchronizes leading edges of pulses of said PWM drive signal to said oscillator clock signal and gradually increases said widths of pulses of said PWM drive signal at power supply start up in response to said soft start signal.

7. Control circuitry according to claim 1, further comprising:
a drive circuit for driving said primary-side switching elements with said PWM drive signal.

8. Control circuitry according to claim 1, wherein said certain operating conditions include a maximum duty-cycle limit of the PWM drive signal.

9. Control circuitry according to claim 1, wherein said supervisory circuitry includes circuitry for monitoring one or more primary-side circuit parameters and generating a primary-side control signal for each of said one or more parameters, each primary-side control signal indicating when a respective parameter has crossed a predetermined threshold.

10. Control circuitry according to claim 9, wherein said one or more primary-side control signals include a primary-side current-limit signal.

11. Control circuitry according to claim 9, wherein said one or more primary-side control signals include a volt-second limit signal.

12. Control circuitry according to claim 1, wherein said primary-side controller further includes circuitry for monitoring one or more primary-side circuit critical parameters and generating a major fault signal for each of said one or more critical parameters, said major fault signal indicating when a respective critical parameter has crossed a predetermined threshold, and wherein the control circuitry is operative to initiate a power supply shutdown in response to one or more of said major fault signals.

13. Control circuitry according to claim 12, wherein said one or more major fault signals include an input under-voltage signal and an input over-voltage signal.

14. Control circuitry according to claim 12, wherein said one or more major fault signals include a primary-side excessive over-current signal.

15. Control circuitry according to claim 12, wherein said one or more major fault signals include a primary-side continuous pulse-by-pulse over-current signal.

16. Control circuitry according to claim 12, being further operative to initiate a follow-up restart of the power supply after the power supply shutdown.

17. Control circuitry according to claim 1, wherein the power supply is a DC power supply, and wherein secondary-side controller is operative to generate the PWM control signal such that when used to control the one or more primary-side switching elements a predetermined DC output voltage level is maintained.

18. Control circuitry for an isolated switching-mode power supply operating under secondary-side control, comprising:
a secondary-side controller operative to monitor an output voltage of the power supply and to generate a pulse-width-modulated (PWM) control signal, the PWM control signal being generated such that it can be used to control one or more primary-side switching elements in the power supply to maintain a predetermined output voltage level; and
a primary-side controller operative to receive the PWM control signal and to generate a PWM drive signal to control the primary-side switching elements, the primary-side controller including:
pulse width determining circuitry operative, when enabled, to modulate the PWM drive signal as dictated by the PWM control signal; and
protection circuitry operative to monitor one or more primary-side circuit critical parameters and, upon determining that the value of a given parameter signifies a major fault condition, to disable the modulating of the PWM drive signal by the pulse width determining circuit.

19. Control circuitry according to claim 18, wherein the critical parameters include a primary-side supply voltage, and wherein the monitoring includes determining whether the primary-side supply voltage is greater than a predetermined over-voltage limit and determining whether the primary-side supply voltage is less than a predetermined under-voltage limit.

20. Control circuitry according to claim 18, wherein the critical parameters include a primary-side output current, and wherein the monitoring includes determining whether the instantaneous primary-side output current exceeds a predetermined over-current limit.

21. Control circuitry according to claim 18, wherein the critical parameters include a primary-side output current, and wherein the monitoring includes determining whether the primary-side output current over a series of continuous pulses exceeds a predetermined continuous pulse-by-pulse over-current limit.

* * * * *